United States Patent [19]

Dörsam

[11] Patent Number: 4,627,916
[45] Date of Patent: Dec. 9, 1986

[54] DIRT FILTER FOR SEMIFLUID THERMOPLASTIC MEDIA

[75] Inventor: Karl-Heinz Dörsam, Buchen-Bödigheim, Fed. Rep. of Germany

[73] Assignee: Odenwälder Kunststoffwerke GmbH, Buchen, Fed. Rep. of Germany

[21] Appl. No.: 783,237

[22] Filed: Oct. 1, 1985

Related U.S. Application Data

[63] Continuation-in-part of Ser. No. 656,903, Oct. 2, 1984, abandoned.

[30] Foreign Application Priority Data

Jan. 28, 1984 [EP] European Pat. Off. ......... 84100896.4
Aug. 22, 1984 [EP] European Pat. Off. ......... 84109965.8
Jul. 19, 1985 [DE] Fed. Rep. of Germany ....... 8520879

[51] Int. Cl.$^4$ ...................... B29C 47/68; B29C 45/17
[52] U.S. Cl. ................................. 210/488; 210/418; 210/492; 425/197
[58] Field of Search ............... 425/197, 198; 210/418, 210/488, 492

[56] References Cited

U.S. PATENT DOCUMENTS

| 4,386 | 2/1946 | Jennison | 210/497.3 |
| 2,636,218 | 4/1953 | Orsini | 425/197 |
| 2,886,850 | 5/1959 | Kublliunas | 425/199 |
| 2,895,167 | 7/1959 | Paggi | 425/197 |
| 3,146,495 | 9/1964 | Sanford | 425/197 |

Primary Examiner—Willard E. Hoag
Attorney, Agent, or Firm—Horst M. Kasper

[57] ABSTRACT

A dirt filter for thermoplastic media has a barrier member within a filter chamber which, in case of an axially symmetrical arrangement with respect to the flow axis, has the basic shape of a double cone. The barrier member defines a barrier gap for the flowing media within the filter chamber. The barrier gap can be widened to a cleaning gap as a result of a displacement of the barrier member. An adjusting member, can be provided which includes an adjusting element, which is mounted in a reception member so as to rotate around its longitudinal axis. The rear end of the adjusting member can be constructed with hexagon wrench faces, which are accessible from the outside of the housing.

21 Claims, 10 Drawing Figures

DIRT FILTER FOR SEMIFLUID THERMOPLASTIC MEDIA

CROSS-REFERENCE TO RELATED APPLICATIONS

This application is a continuation-in-part application of another application filed Oct. 2, 1984 and bearing Ser. No. 656,903. The entire disclosure of this latter application, including the drawings thereof, is hereby incorporated in this application as if fully set forth herein.

BACKGROUND OF THE INVENTION

1. Field of the Invention

The present invention relates to a dirt filter for semifluid thermoplastic media with a filter chamber hollowed out from a housing and which issues with a circular cross-section into the filter chamber coaxially to a flow axis, with a drain line hollowed out from the casing and which with a circular cross-section emanates from the filter chamber on the side opposite to the feed line inlet and coaxial to the flow axis, the filer chamber and barrier member being constructed in axially symmetrical manner with respect to the flow axis and smooth and the internal diameter of the filter chamber, measured at right angles to the flow axis, being at all points larger than the external diameter of the filter member measured at the same axial height and the difference between said two diameters initially decreasing and then increasing in the flow direction.

2. Brief Description of the Background of the Invention Including Prior Art

In the injection molding of thermoplastic material, the medium which becomes semifluid on heating is fed to an injection nozzle and from the latter is supplied to a fixed injection mold. Impurities and contaminants within the medium, e.g. metal fragments, can block the injection nozzle and can lead to faulty moldings.

In the case of dirt filters of the aforementioned type, the dirt particles jam in the inflow side part of the barrier member between the latter and the wall of the filter chamber and are consequently held back by the same.

In a known dirt filter of the aforementioned type, the barrier member is a ball and the filter chamber is roughly shaped like an ellipsoid, whose larger axis extends in the direction of the flow axis. As a result of the necessary deflection, the ball configuration of the barrier member offers the inflowing thermoplastic medium an undesired resistance. In this known filter, the filtering action is not variable, not even through the replacement of the barrier ball by an e.g. smaller ball, because the latter does not then assume the position necessary for a correct filtering within the filter chamber.

Orsini teaches in U.S. Pat. No. 2,636,218 an extrusion unit for molding plastic materials. It appears that there is no suggestion in this reference as to an in situ cleaning of the body 11. European Patent Application 0 010 338 to Gerrit Jan Ter Beek teaches a filter for filtering viscous liquids and particularly molten synthetic resins. The material is passed and filtered through a slit defined by a chamber and a smooth strapped revoluntionary body. The reference apparently does not suggest moving the revoluntionary body from the outside.

SUMMARY OF THE INVENTION

The problem of the invention, in connection with a filter of the aforementioned type, is to keep the unavoidable flow resistance as small as possible and to permit the variability of the filtering action by the replacement of one barrier member by another, differently dimensioned member.

The present invention provides a dirt filter for semifluid thermoplastic media. A housing is manufactured for a filter chamber hollowed out from said housing. A barrier member is disposed in the filter chamber, which barrier member is adjustable in its position by sliding along the flow axis from a filtering position to a cleaning position and vice versa. A feed line inlet is hollowed out from the housing, which issues into the filter chamber. A discharge line hollowed out from the housing which is led out of the housig on a side which is opposite to that side of the barrier member, which is the side of the feed line inlet. An annular slot is disposed between a surrounding area of the barrier member and is disposed coaxially to the flow axis and is oppositely disposed relative to an inner wall of the filter chamber, where the annular slot is part of the flow connection between feed line inlet and discharge line. The annular slot is a blocking slot in the filtering position of the barrier member, which is wider than the blocking slot such that dirt particles to be retained cannot pass through. The annular slot is a cleaining slot in the cleaning position of the barrier member, which is too narrow such that the dirt particles retained by the blocking slot can pass through. An adjustment member is accessible from the outside for adjusting the position of the blocking member from its filtering position into the cleaning position and vice versa. A guide body adjoins the end of the blocking body on the side disposed toward the feed line inlet. A bead is provided at the guide body and protruding outwardly in a radial direction relative to the flow axis and matching a guide recess of the housing when the barrier member is slided in the direction of the flow axis. The adjustment member is coupled in a force transmitting way at the circumference of the bead. Channels are distributed along the circumference of the bead of the guide body for flow through of semifluid thermoplastic media, where the passage width of the channels is larger than the passage width of the blocking slot.

The longitudinal diameter of the barrier member measured in the direction of the flow axis can be larger than the maximum transverse diameter of the barrier member measured at right angles thereto. The barrier member is basically shaped like two cones placed on top of one another by their bases. The two cones of the barrier member are bounded in the area between rounded portions by circular cone-shaped surfaces and wherein these facing wall surfaces of the filter chamber are also formed by circular cone-shaped surfaces, but the apex angles of the circular cones associated with the barrier member are larger than the apex angles of the circular cones associated with the filter member. The two ends of the barrier members can be rounded. The barrier member can be rounded along its periphery along an abutting base surface.

Support segments can project into the filer chamber, which support segments are provided at a fixed place at the housing and are distributed in a regular way relative on the periphery. The barrier member can be centered with respect to the flow axis and is dimensioned so as to fit relative to the support segments.

At least three support segments can be provided in each case for both ends of the barrier member and which, relative to the longitudinal diameter, leave free the central area of the barrier member, which at least extends over one third of the longitudinal diameter of said barrier member.

The inflow side end of the barrier member is more pointed than in the case of a ball and therefore offers less resistance to the flow. Those parts of the barrier member which do not come into contact with support segments can, without influencing the centering of the latter, be shaped in different ways. Thus differently shaped barrier members can be provided, which are all centered by the same support segments. By replacing the barrier member it is possible to adjust the filtering action.

For reliable centering, it is sufficient to use support segments which only extend over two end areas of the barrier member, so that an intermediate central area of the barrier member can be shaped independently of the support segments. The central area which is left preferably extends over at least one third of the longitudinal diameter of the barrier member.

It is recommended that a dirt collection trap or pocket be hollowed out in the vicinity of the inflow side cone of the barrier member. For this purpose, preferably the surface of the free flow cross-section in the filter chamber, starting from the surface of the flow cross-section in the feed line, is made larger in the flow direction and then narrows to the narrow cross-section in the vicinity of the largest transverse diameter.

As a result of such a dirt collection trap, the free flow cross-section left between the dirt particles being deposited is far too rapidly constricted to an unacceptable degree by the dirt particles which are increasing deposited.

Great importance is attached to the external shape of the barrier member with respect to the inner wall of the filter chamber in connection with the filtering action and producing the aforementioned dirt collecting trap. In the simplest case, these are circular cone-shaped surfaces between the rounded surfaces, as defined in claim 5. As a result of a spherical or necked deformation of these circular cone-shaped surfaces of the barrier member and/or the dirt filter chamber, the configuration of the cross-sectional surface in the through-flow direction can be given a suitable configuration meeting the particular requirements.

Although not necessary, it is desirable to make the barrier member mirror symmetrical so that in cannot be incorrectly positioned.

The invention entails the additional advantage that there is no need to open the housing for cleaning purposes. According to the invention it is merely necessary to move the barrier member into the cleaning position, so that the collected dirt is entrained by the flowing medium. A portion of highly contaminated medium then passes out of the injection nozzle and is discarded. The barrier member is then again placed in its filtering position and injection operation can be continued.

During the normal filter operation, the through-flowing medium exerts a pressure on the barrier member in the flow direction. It is therefore recommended that the barrier member is made adjustable in its cleaning position counter to the flow direction.

It is particularly important for a completely satisfactory operation that the barrier gap is precisely dimensioned. For this purpose, the barrier member must be in a precisely predetermined position for filter purposes. The surface of the free flow cross-section in the vicinity of the largest transverse diameter can be the smallest in the filter chamber and is also smaller than that of the feed line and the drain line.

A dirt collecting pocket or trap can be hollowed out in the vicinity of the inflow side cone of the barrier member. The surface of the free flow cross-section in the filter chamber, starting from the surface of the flow cross-section in the feed line, can be larger in the flow direction and then decreases to the narrow cross section in the vicinity of the largest transverse diameter.

There can be a mirror symmetrical construction of the barrier member relative to a mirror symmetrical plane positioned at right angles to the longitudinal diameter of the barrier member. The feed line can be hollowed out from the housing and issue with a circular cross-section coaxially relative to the flow axis in the filter chamber. The drain discharge line can be hollowed out from the housing and emanate with a circular cross-section from the filter chamber side opposite to the opening of the feed line inlet and coaxial to the flow axis. The filter chamber and the barrier member can be constructed in rotationally symmetrical manner to the flow axis and have a smooth surface. The internal diameter of the filter chamber, measured at right angles to the flow axis is larger throughout than the external diameter measured on the same axial height, of the barrier member located in the filtering position and where the difference between the internal diameter and the external diameter in the flow direction initially decreases to a barrier cross-section of an annular barrier gap and then again increases downstream thereof.

With the housing closed, the barrier member can be displaced from its filtering position along the flow axis into a cleaning position along the flow axis and wherein with the barrier member in the cleaning position an annular cleaning gap is formed in place of the barrier gap, the passage width of the cleaning gap being larger than that of the barrier garp.

The barrier member can be adjustable counter to the flow direction into its inoperative position. The barrier member can have an annular stop face, coaxial to the flow axis and directed into the flow direction. An annular counter-stop face adjacent to the filter chamber is preferably provided on the housing. The annular counter-stop face can be directed counter to the flow direction and coaxial to the flow axis. The stop face of the barrier member can engage with the counter-stop face of the housing when the barrier member is in the filtering position.

A guidance member can be fixed to at least one end of the barrier member in the extension thereof. The guidance member preferably fits in a positive manner such as to be displaceable in the flow direction in a guidance recess of the housing. Channels for the thermoplastic medium can be hollowed out in a peripherally distributed manner in the guidance member and/or in the part surrounding the guidance recess and their passage width can be greater than that of the barrier gap.

As a result of the pressure of the flowing medium, the barrier member is then moved into its filtering position defined by the stop face and the counter stop face and is adequately supported at these faces which can be given a corresponding stable construction, to withstand the, in certain circumstances, very high pressure of the inflowing medium.

The device for adjusting the barrier member in the cleaning position and back into the filtering position must have a simple construction and must be easy to handle.

An annular conical surface narrowing in the flow direction and coaxial to the flow axis is preferably provided externally on a guidance member. An externally accessible grub screw can be constructed as an adjusting screw and is provided in the housing radially to the flow axis. The grub screw can be directed towards the wide end of the conical surface when the barrier member is in the filtering position.

A dirt pocket is preferably formed upstream of the barrier gap based on the barrier member in the filtering position. The diameter difference between the external diameter of the barrier member and the internal diameter of the filter chamber upstream of the barrier gap can decrease more in the flow direction than said diameter difference increases in the flow direction on the downstream side of the barrier gap.

The barrier member preferably has the basic shape of two cones placed upon one another by their bases in the central area. The barrier member can peripherally be rounded along the abutting base surfaces. The barrier gap preferably is level with the abutting base surface based on the filtering position of the barrier member.

Several barrier gaps can be successively arranged in a spaced manner relative to the flow direction. The diameter difference between the external diameter of the barrier member and the internal diameter of the filter chamber can decrease and then increase again upstream of the barrier gap based on the flow direction. A cleaning gap for the barrier member in the cleaning position can be associated with each barrier gap. The first of said barrier gaps as seen in the flow direction preferably has the largest passage width. The next passage gap can have a smaller passage width and is followed by passage gaps showing a corresponding relationship. The cleaning gaps can all have larger passage widths than the largest barrier gap. The adjustment member preferably includes an adjusting element which is mounted in a reception member so as to rotate about its longitudinal axis. The rear end of the adjusting element can be constructed with hexagon wrench faces, which are accessible from the outside of the filter housing.

In case of a large amount of dirt, it is advantageous to initially separate the large dirt particles, then the smaller particles and so on, so that the amount of dirt produced at a particular point is small, which is in the interest of prolonged operation. For this purpose, several correspondingly dimensioned dirt filters can be connected in series. This effort and expenditure is avoided by a construction of the invention according to claim 13, in which a multiply staggered filtering in a single barrier member is possible and a simple cleaning possibility is provided.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

In accordance with the present invention, there is shown in FIGS. 1 to 6 a filter housing, with the housing designated by reference numeral 1. The filter housing 1 comprises two parts 2 and 3, which are detachably interconnected along screw coupling 4. In order to faciliate screwing together, part 2 has hexagonal key faces 5, while part 2 is constructed as an injection nozzle 7. At the rear end of part 3 is provided a connecting sleeve 8 with an external thread 9 and an associated stop face 10 for screwing the housing to an upstream—positioned supply means for the pressurized fluid, thermoplastic medium, e.g. plastic.

A feed line 11 and a drain line 12, in each case with a circular cross-section, are hollowed out of the housing 1 coaxial to flow axis 14. The feed line 11 issues into a filter chamber 13, from which the drain line 12 emanates on the opposite side. The thermoplastic medium flow direction corresponds to arrow V A loose barrier member 15 is placed in filter chamber 13, being shown in FIG. 1 in the filtering position which it assumes during filtering. In this filtering position, an annular stop face 16 of barrier member 15 which is coaxial to the flow axis 15 and is directed in the flow direction engages with a counter-stop face 17 of housing 1, which is also annular and coaxial to the flow axis 15 and is directed counter to the flow direction.

Apart from slots 18 to 21, barrier member 15 is axially symmetrical and coaxial to flow axis 14 and also to the axailly symmetrically constructed filter chamber 13. The central area of barrier member 15 has the fundamental shape of two cones 23, 24, which are placed upon one another at their base 22. On its periphery and along the abutting base surfaces, the barrier member has rounder portion 25. The two ends of the barrier member are constructed as guidance members 26, 27, which positively engage in guidance recesses 28, 29, of the housing and are displaceably guided therein along flow axis 14. Counter to the flow direction, the barrier member can be moved out of the filtering position of FIG. 6. The barrier member maintains its coaxial position to the flow axis 14 in the filtering position, the cleaning position and all intermediate positions.

Both the guidance members 26, 27, have the aforementioned slots 18, 21, distributed over their periphery, said slots extending along the flow axis and thus permitting the through-flow of the medium.

Except in the area of slots 18 to 21, the external diameter of the barrier member according to double arrow 30, is everywhere smaller than the internal diameter according to double arrow 31 of filter chamber 13 and measured at the same axial height. Thus, an annular intermediate space 33 is left everywhere in the filter chamber and through it can flow the filter medium. Thus, the filter medium enters into the feed line, from where it passes through slots 18, 19, into the intermediate space 33 and from there to 20, 21, into the drain line and finally through nozzle 107 into a connected, not shown mold.

The intermediate space 33 is narrowest in the vicinity of the rounded portion 25, so that an annular barrier gap 34 is formed there and forms the point with the narrowest passage width for the through-flow of the medium. Thus, the dirt particles are held back upstream of this barrier gap 34. The diameter difference of the internal diameter of the filter chamber and the external diameter of the barrier member initially decreases in the flow direction in the area 35 upstream in the barrier gap and then increases again in area 36 downstream of the barrier gap. The diameter difference in area 35 is much greater then the increase in area 36. Thus, a dirt collecting pocket or trap 38 is formed upstream of the barrier gap in the flow direction and can collect the dirt. This pocket or trap is made as large as possible and extends almost up to the guidance member 27.

In the flow direction upstream of the barrier gap 34, the internal diameter of the filter chamber exceeds the height of the barrier gap. If the barrier member enters its cleaning position shown in FIG. 1, then the rounded portion 25, i.e. the widest area of the barrier member, assumes a facing position with respect to this widest point of the filter chamber and consequently a wide cleaning gap 40 is formed in place of the narrow barrier gap. The passage width of the cleaning gap is appropriately somewhat greater than the passage width of slots 18 and 19.

45 is a reception member, which is screwed into the housing by thread 44. A grub screw serving as an adjusting screw is introduced coaxially into the reception member. By means of thread 48, the grub screw is screwed to the reception member 45 and its free end passes into hole 49 of housing 1. The grub screw 41 has socket head cap screw wrench receptacle 42. A locking screw 46 is screwed into the reception member by means of thread 47 and has a central opening through which the socket head cap screw wrench receptacle is accessible from the outside. The grub screw 41 is directed radially at the concial surface 43 of the barrier member. This conical surface 43 is circular and coaxial to flow axis 14, tapering the flow direction. In the filtering position of the filtering member shown in FIG. 6, grub screw 41 is directed towards the wide end of the conical surface. The grub screw is slackened back in this position and its head engages hard against the locking screw 46, so that the seal is obtained there. On tightening the grub screw 41, the barrier member passes into its cleaning position and slides on conical surface 43 towards the narrower end of the conical surface. The barrier member has reached its cleaning position when the head of the grub screw strikes against the lower shoulder 59 of the reception member 45. In this cleaning position there is a seal between shoulder 59 and the head of the grub screw 41. The seals of the grub screw in both the filtering and cleaning positions thereof can be aided by in each case one annular cutting edge of the two slides of the screw head which press into the locking screw of shoulder 59. If the grub screw is slackened again from its cleaning position into the filtering position shown in FIG. 1, then, following the pressure of the medium the barrier member move back into its filtering position shown in FIG. 1.

During operation, slots 18, 19, act as prefilters and the barrier gap 34 as the main filter. Dirt collects in the dirt collecting trap 38 upstream of the barrier gap 34, where it is held back and finally fills the trap. When this has taken place, the flow impediment by the dirt collected in the trap is so great that operation must be interrupted. The grub screw 41 is now tightened, so that the barrier gap 34 opens towards the cleaning gap 40 and the medium can entrain the dirt collected in the dirt trap. Slots 20, 21 and nozzle 7 are wide enough, so that the dirt can pass through unimpeded at this point. The medium portion enriched with the dirt is discarded. The grub screw 41 is then slackened off again and the barrier member returns to its filtering position and injection operation can be continued.

Only relatively large dirt particles collect upstream of slots 18, 19, which, if at all, are expected only on a very rare basis, so that no disturbances by the collected dirt is to be expected there, even after a long period of operation. However, if such a disturbance should occur, then operation must be interrupted and the filter housing cleaned in the open state. According to the invention, it is important that the dirt which is normally obtained is collected in the dirt trap and can be blown out by briefly operating the grub screw.

Figure 7:
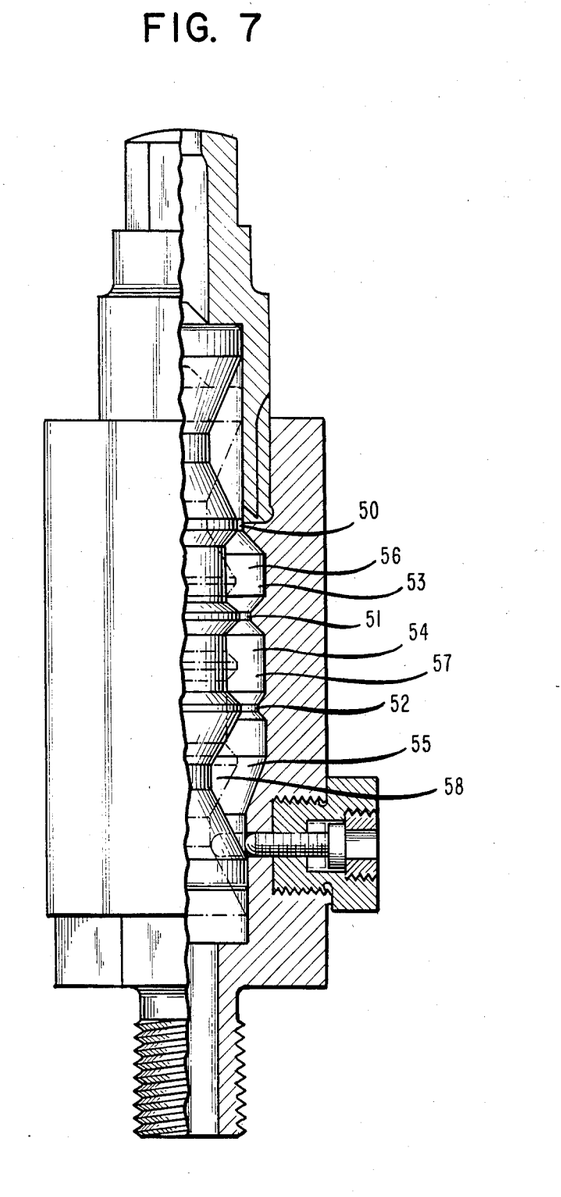
FIG. 7 is a view of a different embodiment of a dirt filter in partial section and which is equipped with three barrier gaps.

Three successively arranged barrier gaps 50 to 52 are employed. Barrier gap 50 has a larger passage width than barrier gap 51, which in turn has a larger passage width than barrier gap 52. Cleaning gaps 53, 54, 55 and dirt pockets 56, 57, 58, are associated with these three barrier gaps. The barrier gaps widen towards the in each case associated cleaning gap if the barrier member is moved into its cleaning position indicated in brocken line form. The cleaning gaps 53, 54, 55, all together have a larger passage width than barrier gap 52, so that the dirt from all the three dirt pockets can flow out unimpeded through all the cleaning gaps if the barrier member is in its cleaning position.

Figure 1:
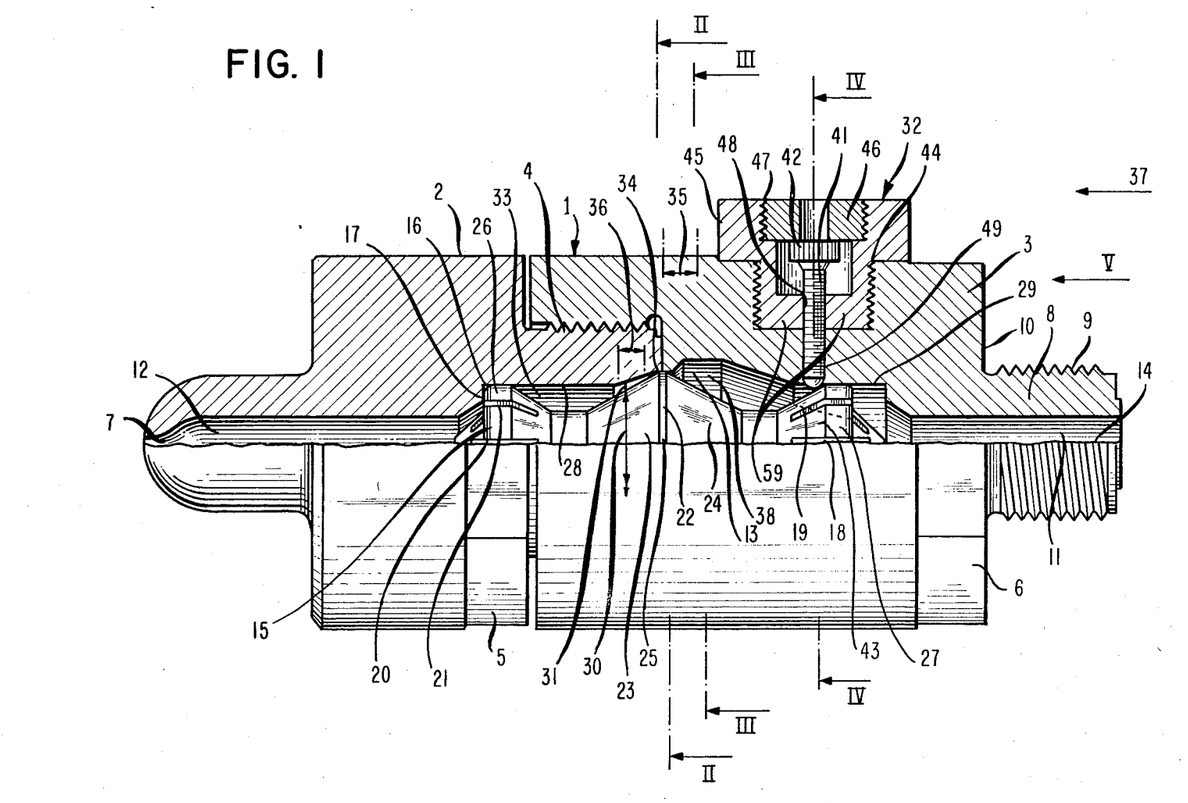
FIG. 1 is a view of a dirt filter according to the invention with a barrier member in the filtering position, half in section and half in elevation.
Figure 2:
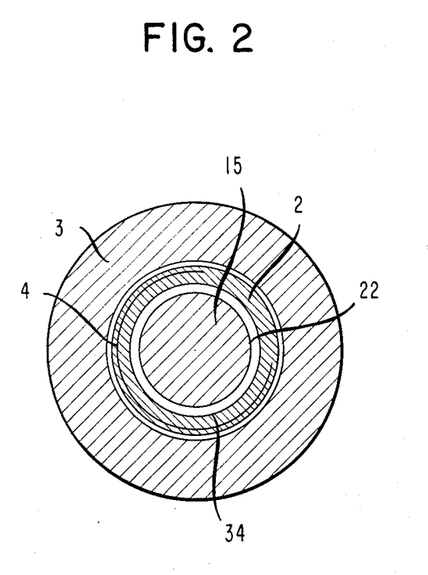
FIG. 2 is a view of section II of FIG. 1.
Figure 3:
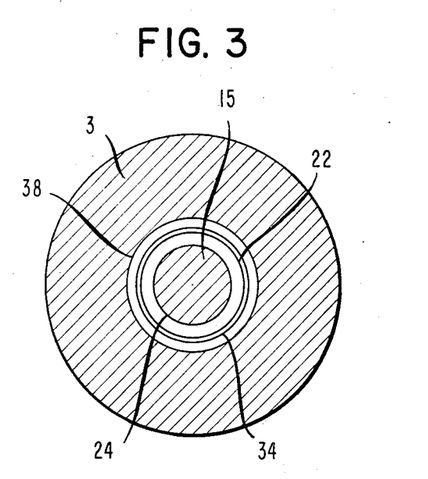
FIG. 3 is a view of section III of FIG. 1.
Figure 4:
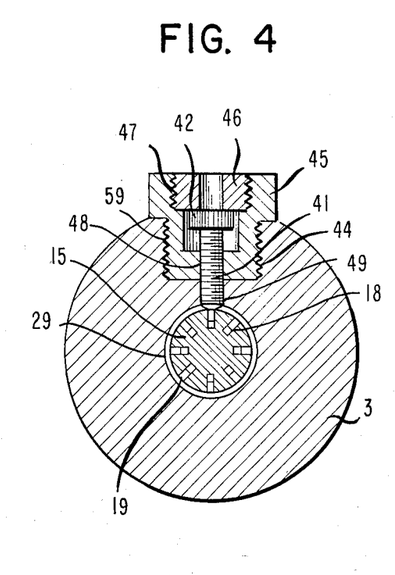
FIG. 4 is a view of section IV of FIG. 1.
Figure 5:
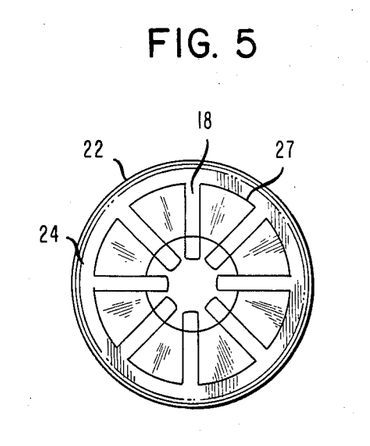
FIG. 5 is a view of the barrier member of FIG. 1 solely in the view according to arrow V.
Figure 6:
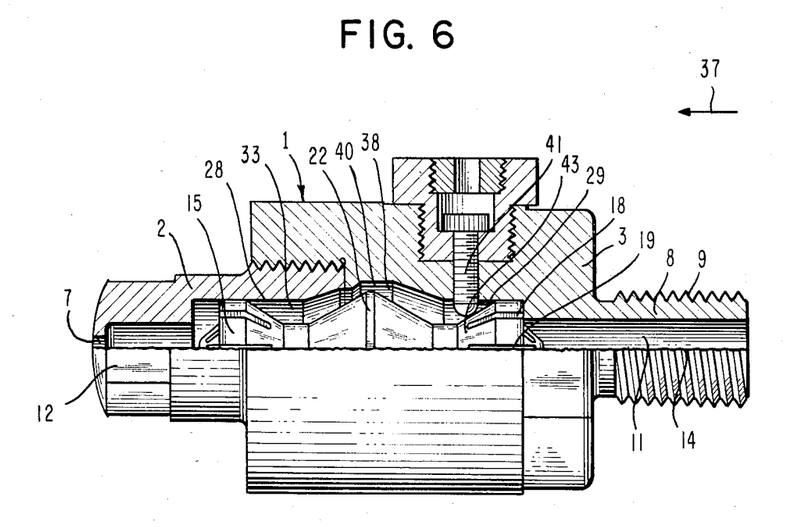
FIG. 6 is a view of the dirt filter of FIG. 1, but with the barrier member in the cleaning position.
Figure 8:
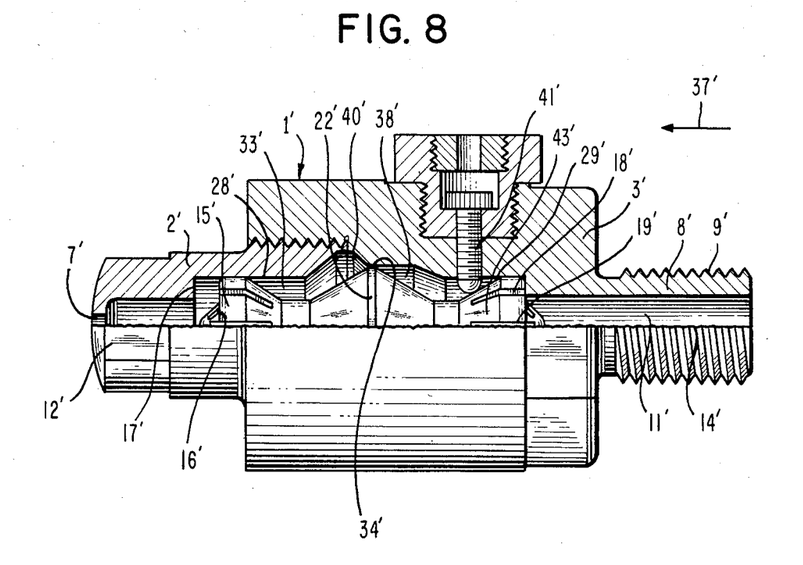
FIG. 8 is a view of a partial section of another embodiment of a dirt filter.

The embodiment shown in FIG. 8 differs from that of FIGS. 1 to 6 only through the construction of the filter chamber 33'. FIG. 8 shows the dirt filter in the filtering position, in which the barrier member 15' is displaced rearwards counter to the flow direction by the tightened grub screw 41'. In this position, there is only a narrow barrier gap 34' in intermediate space 33' and serves to hold back or retain the dirt particles collecting in the dirt pocket 38'. For cleaning purposes, the grub screw 41' is slackened off. The barrier member 15' is then moved forwards in the flow direction and into the cleaning position when its stop face 16' strikes against the counterstop face 17'. It this cleaning position, not shown in FIG. 6, the barrier gap 35' has widened to a wider cleaning gap 40'. Otherwise, the embodiment of FIG. 6 is constructed in the same way as the embodiment according to FIGS. 1 to 6.

As the modification of the embodiment according to FIGS. 1 to 6, corresponding to slots 18 to 21, slots can also be provided in those housing parts surrounding the guidance recesses corresponding to guidance recesses 28, 29. In place of the slots, it is also possible to provide channels. In certain circumstances, it is sufficient to have a single guidance member at the end of the narrow member.

Instead of one of three barrier gaps as provided by FIGS. 1 to 12, it is possible to have a different number of such gaps with associated cleaning gaps and dirt collecting pockets or traps. The diameters relationships are chosen in the same way as described relative to FIG. 7.

Figure 9:
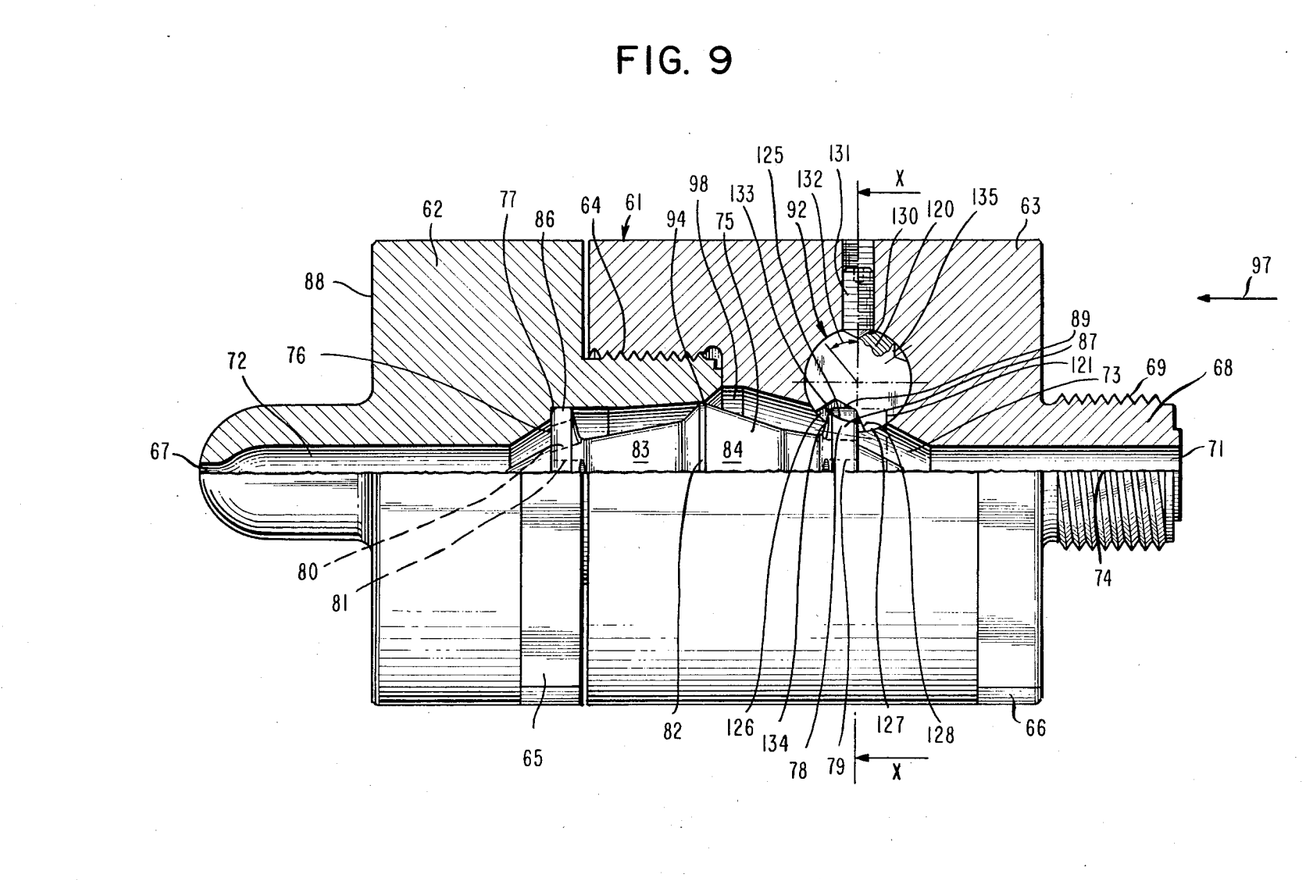
FIG. 9 is a view of a partial section of a further embodiment of a dirt filter.
Figure 10:
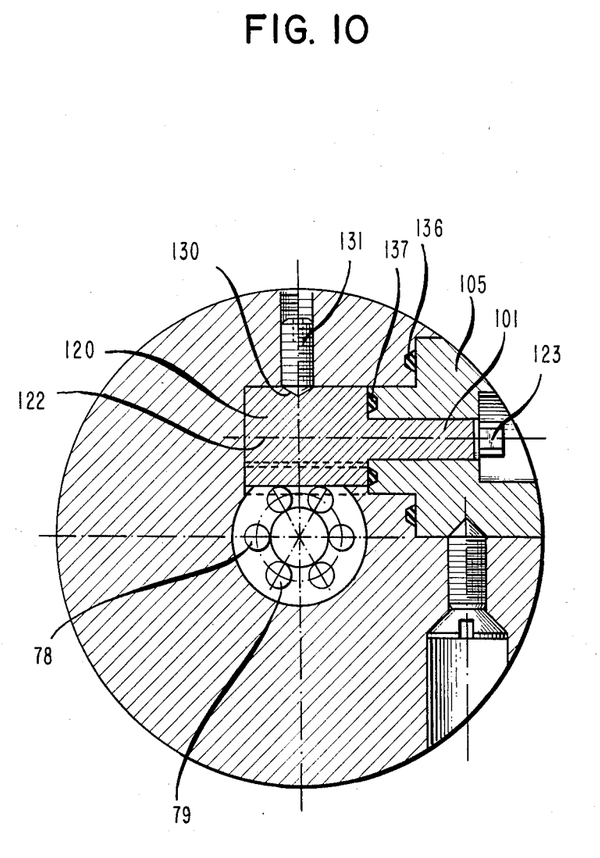
FIG. 10 is a sectional view of the section X—X indicated in FIG. 9.

In the embodiments shown in FIGS. 9 and 10, the filter housing 61 is in two parts. Filter housing part 62 is screwed to filter housing part 63 by a screw coupling 64 coaxial to the flow axis 74. Screwing is facilitated by two hexagon key or wrench faces 65, 66 on each of the parts 62, 63. The injection nozzle is 67 and the connecting sleeve is 68, which is provided with an external thread 69. A feed line 71 issues into a filter chamber 73 which, via a drain line 72, issues into injection nozzle 67. A barrier member 75, formed from two approximately conical cone parts 83, 84 is located in filter chamber 73. The two cone parts are provided with beads 86, 87, through which extend channels 78 to 81, which are axially parallel to flow axis 74 and whose function corresponds to that of slots 18 to 21 in FIGS. 1 to 6. Reference numeral 92 designates an adjusting member, which is placed in filter housing 61 and has an actuating disc 120, which bounds the filter chamber 73.

Apart from channels 78 to 81, barrier member 75 is constructed in a rotationally symmetrical manner to flow access 74. Apart from the actuating disc 120, feed line 71, filter chamber 73, drain line 72 and injection nozzle 67 are constructed in a rotationally symmetrical manner to flow access 74.

The two beads 86, 87 serving as guidance members are positively guided in corresponding guidance recesses 88, 89. Barrier member 75 can be moved from its filtering position represented in continuous line form, counter to the flow direction in accordance with arrow 97 into its cleaning position indicated by the dot-dash line 121. When the barrier member is in the filtering and cleaning positions, it is coaxially guided in by the positive engagement of beads 86, 87 in guidance recesses 88, 89. The filter chamber 73 is interrupted by the two beads 86, 87. The flow of the flowable thermoplastic medium pressed in at feed line 71 takes place through channels 78 to 81 in the vicinity of the beads. Thus, the overall cross-section of the channels is larger than the narrowest cross-section of the filter chamber in the filtering position. The narrowest cross-section of the filter chamber in the filtering position is formed by a barrier gap 94. Upstream of the barrier gap the filter chamber 73 is widened to form a dirt pocket 98, in which can collect the dirt entrained by the filter medium and which is held back at the barrier gap. Downstream of the barrier gap, the filter chamber is greatly widened with a view to bringing about a minimum flow resistance. Filter housing 61 has a recess for the dirt pocket 98. In addition, the cone part 84 can be constricted, in the same way as cone part 83. In the place of or in addition to the construction of cone part 83, filter housing part 62 can be constricted, as in the case for part 63 for forming dirt pocket 98.

For fitting and repair purposes, the two parts 62, 63 are unscrewed and then the barrier member can be removed. This is unnecessary for cleaning the dirt pockets 98, for which purpose the barrier member 78 is moved counter to the flow direction into its cleaning position. This leads to the opening of barrier gap 94, because the widest base 82 of barrier member 75 bounding the barrier gap is consequently brought into a facing position with respect to further set back parts of the filter housing and forming the dirt pocket 98. The dirt from the dirt pocket is entrained by the through-flowing filter medium and leaves the filter housing via injection nozzle 67. The filter medium portion intensely contaminated in this way is discarded. The barrier member is then moved back into its filtering position.

As stated, adjusting member 92 includes an adjusting element 101, which is mounted in reception member 105 so as to rotate about its longitudinal axis 122. Reception member is fitted into housing 61 and ground in. The rear end of adjusting element 101 is constructed with hexagon wrench faces 123, which are accessible from the outside of the filter housing. The actuating disc 120 is fixed in torsionally stiff manner on the front end of adjusting element 101. The actuating disc has a cutout 126 extending over a circumferential segment in accordance with double arrow 125. In both the cleaning and the filtering positions of the barrier member, bead 87 projects into cutout 126 and fits with clearance in the same.

In FIG. 9, actuating disc 120 is shown in continuous line form in its first position corresponding to the filtering position of the barrier member. In the position, radial shoulder 127 bounding cutout 126 engages on its facing stop face 128 of bead 87. In the first position, actuating disc 120 is secured by a grub screw screwed into the filter housing and engaging in a securing trough. Grub screw 131 is accessible and detachable from the ouside. In the represented filtering position, barrier member 75 with its stop face 76 engages a stop counter-face 77 of filter housing 61. In addition, stop face 128 engages on shoulder 127. Barrier member 75, moved into its filtering position by the pressure of the through-flowing filtering medium, can not move back out of its filtering position, even when the pressure of the filter medium decreases. It is prevented from doing this by shoulder 127. This is advantageous, because it is then always ensured that the barrier gap 94 does not even slightly open in filter operation, or there is no floating backwards and forwards of the barrier member in its filtering position. Caskets for sealing the filter chamber are designated as 136 and 137.

For cleaning purposes, the barrier member is moved into its cleaning position with the aid of adjusting member 92. For this purpose grub screw 131 is loosened. Then, using a wrench on the hexagon wrench face 123, adjusting element 101 is turned counter clockwise by an acute angle according to double arrow 132, relative to the viewing direction according to FIG. 9. The shoulder 133 bounding cutout 126 comes into contact with the facing stop face 134 of the bead and moves the barrier member into its cleaning position, in which barrier gap 94 is wide open. A second securing trough 135, corresponding to securing trough 130 is provided for the cleaning position. A filter medium portion is then passes through, which entrains the dirt which has collected in the dirt pocket 98. Then, with the grub screw loosened, the adjusting member and consequently the barrier member are moved back again into the indicated position. The dirt filter is cleaned and made ready to operate again.

It will be understood that each of the elements described above, or two or more together, may also find a useful application in other types of filter system configurations and semifluid media processing procedures differing from the types described above.

While the invention has been illustrated and described as embodied in the context of a dirt filter for semifluid thermoplastic media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the genericr or specific aspects of this invention.

What is claimed as new and desired to be protected by Letters Patent is set forth in the appended claims:

1. A dirt filter for semifluid thermoplastic media comprising
   a housing for a filter chamber hollowed out from said housing;
   means for opening the housing;
   a flow axis;
   a barrier member disposed in the filter chamber, which barrier member is adjustable in its position by sliding along the flow axis from a filtering position to a cleaning position and vice versa;
   a feed line inlet hollowed out from the housing, which issues into the filter chamber;
   a discharge line hollowed out from the housing, which is led out of the housing on a side which is opposite to
   a side of the barrier member, having the feed line inlet;
   an annular slot disposed between a surrounding area of the barrier member disposed coaxially to the flow axis and to an oppositely disposed inner wall of the filter chamber, the annular slot being part of the flow connection between feed line inlet and discharge line; in the filtering position of the barrier member the annular slot is a blocking slot, which is narrower than the diameter of the dirt particles to be retained so such particles cannot pass through;
   when the barrier member is in the cleaning position clearance between the barrier member and chamber wall is greater than the diameter of the dirt particles retained by the blocking slot so the particles can pass through; an adjustment member accessible from the outside for adjusting the position of the blocking member from its filtering position into the cleaning position and vice versa;
   a guide body adjoining the end of the blocking body on the side disposed toward the feed line inlet; a bead provided at the guide body and protruding outwardly in a radial direction relative to the flow axis and matching a guide recess of the housing when the barrier member is displaced in the direction of the flow axis and where the adjustment member is coupled in a force transmitting way at the circumference of the bead; channels distributed along the circumference of the bead of the guide body for flow through of semifluid thermoplastic media, where the passage width of the channels is larger than the passage width of the blocking slot.

2. The dirt filter for semifluid thermoplastic media according to claim 1
   wherein the longitudinal dimension of the barrier member measured in the direction of the flow axis is larger than the maximum transverse diameter of the barrier member measured at right angles thereto.

3. The dirt filter for semifluid thermoplastic media according to claim 1
   wherein the barrier member is basically shaped like two cones placed on top of one another by their bases.

4. The dirt filter for semifluid thermoplastic media according to claim 3
   wherein the two cones of the barrier member are bounded in the area between rounded portions by circular cone-shaped surfaces and wherein these facing wall surfaces of the filter chamber are also formed by circular cone-shaped surfaces, but apex angles of the circular cones associated with the barrier member are larger than apex angles of the circular cones associated with the filter member.

5. The dirt filter for semifluid thermoplastic media according to claim 1
   wherein the two ends of the barrier members are rounded.

6. The dirt filter for semifluid thermoplastic media according to claim 1
   wherein the barrier member is rounded along its periphery along an abutting base surface.

7. The dirt filter for semifluid thermoplastic media according to claim 1 further comprising
   support segments projecting into the filter chamber, which are provided at a fixed place at the housing and are distributed in a regular way relative on the periphery; and wherein the barrier member is centered with respect to the flow axis and is dimensioned so as to fit relative to the support segments.

8. The dirt filter for semifluid thermoplastic media according to claim 7
   wherein at least three support segments are in each case provided for both ends of the barrier member and which, relative to the longitudinal diameter, leave free the central area of the barrier member, which at least extends over one third of the longitudinal diameter of said barrier member.

9. The dirt filter for semifluid thermoplastic media according to claim 1
   wherein the area of the free flow cross-section in the vicinity of the largest transverse diameter is the smallest in the filter chamber and is also smaller than that of the feed line and the drain line.

10. The dirt filter for semifluid thermoplastic media according to claim 1
    wherein a dirt collecting pocket or trap is hollowed out in the vicinity of the inflow side cone of the barrier member; wherein the area of the free flow cross-section in the filter chamber, starting from the surface of the flow cross-section in the feed line, is larger in the flow direction and then decreases to the narrow cross section in the vicinity of the largest transverse diameter.

11. The dirt filter for semifluid thermoplastic media according to claim 1
    wherein there is a mirror symmetrical construction of the barrier member relative to a mirror symmetrical plane positioned at right angles to the longitudinal diameter of the barrier member.

12. The dirt filter for semifluid thermoplastic media according to claim 1
    wherein the feed line is hollowed out from the housing and issues with a circular cross-section coaxially relative to the flow axis in the filter chamber;

wherein the drain discharge line is hollowed out from the housing and emanates with a circular cross-section from the filter chamber side opposite to the opening of the feed line inlet and coaxial to the flow axis;

wherein the filter chamber and the barrier member are being constructed in rotationally symmetrical manner to the flow axis and have a smooth surface;

wherein the internal diameter of the filter chamber, measured at right angles to the flow axis is larger throughout than the external diameter measured on the same axial height, of the barrier member located in the filtering position and where the difference between the internal diameter and the external diameter in the flow direction initially decreases to a barrier cross-section of an annular barrier gap and then again increases downstream thereof;

wherein, with the housing closed, the barrier member can be displaced from its filtering position along the flow axis into a cleaning position along the flow axis and wherein with the barrier member in the cleaning position an annular cleaning gap is formed in place of the barrier gap, the passage width of the cleaning gap being larger than that of the barrier gap.

13. The dirt filter for semifluid thermoplastic media according the claim 12
wherein the barrier member is adjustable counter to the flow direction into its inoperative position;
wherein the barrier member has an annular stop face, coaxial to the flow axis and directed into the flow direction;
wherein an annular counter-stop face adjacent to the filter chamber is provided on the housing;
wherein the annular counter-stop face is directed counter to the flow direction and coaxial to the flow axis; and
wherein the stop face of the barrier member engages with the counter-stop face of the housing when the barrier member is in the filtering position.

14. The dirt filter for semifluid thermoplastic media according the claim 12
wherein a guidance member is fixed to at least one end of the barrier member in the extension thereof;
wherein the guidance member fits in a positive manner such as to be displaceable in the flow direction in a guidance recess of the housing and wherein channels for the thermoplastic medium are hollowed out in a peripherally distributed manner in the guidance member and their passage width is greater than that of the barrier gap.

15. The dirt filter for semifluid thermoplastic media according to claim 12
wherein a guidance member is fixed to at least one end of the barrier member in the extension thereof;
wherein the guidance member fits in a positive manner and such as to be displaceable in the flow direction in a guidance recess of the housing and wherein channels for the thermoplastic medium are hollowed out in a peripherally distributed manner in the part surrounding the guidance recess and their passage width is greater than that of the barrier gap.

16. The dirt filter for semifluid thermoplastic media according to claim 12
wherein an annular conical surface narrowing in the flow direction and coaxial to the flow axis is provided externally on a guidance member;
wherein an externally accessible grub screw is constructed as an adjusting screw and is provided in the housing radially to the flow axis; and
wherein the grub screw is directed towards the wide end of the conical surface when the barrier member is in the filtering position.

17. The dirt filter for semifluid thermoplastic media according the claim 12
wherein a dirt pocket is formed upstream of the barrier gap based on the barrier member in the filtering position;
wherein the diameter difference between the external diameter of the barrier member and the internal diameter of the filter chamber upstream of the barrier gap decreases more in the flow direction than said diameter difference increases in the flow direction on the downstream side of the barrier gap.

18. The dirt filter for semifluid thermoplastic media according to claim 12
wherein the barrier member has the basic shape of two cones placed upon one another by their bases in the central area;
wherein the barrier member is peripherally rounded along the abutting base surfaces; and
wherein the barrier gap is level with the abutting base surface based on the filtering position of the barrier member.

19. The dirt filter for semifluid thermoplastic media according the claim 12
wherein several barrier gaps are successively arranged in a spaced manner relative to the flow direction;
wherein the diameter difference between the external diameter of the barrier member and the internal diameter of the filter chamber decreases and then increases again upstream of the barrier gap based on the flow direction;
wherein a cleaning gap for the barrier member in the cleaning position is associated with each barrier gap;
wherein the first of said barrier gaps as seen in the flow direction has the largest passage width;
wherein the next passage gap has a smaller passage width and is followed by passage gaps showing a corresponding relationship; and
wherein the cleaning gaps all have larger passage widths than the largest barrier gap.

20. The dirt filter for semifluid thermoplastic media according to claim 1
wherein the adjustment member includes an adjusting element which is mounted in a reception member so as to rotate about its longitudinal axis.

21. The dirt filter for semifluid thermoplastic media according to claim 19
wherein the rear end of the adjusting element is constructed with hexagon wrench faces, which are accessible from the outside of the filter housing.

* * * * *